United States Patent [19]

Thompson

[11] Patent Number: 5,486,083
[45] Date of Patent: Jan. 23, 1996

[54] PROCESS AND APPARATUS FOR HANDLING A VEHICLE FRAME

[75] Inventor: Terry L. Thompson, Perrysburg, Ohio

[73] Assignee: J Star Consolidated, Stony Ridge, Ohio

[21] Appl. No.: 319,129

[22] Filed: Oct. 6, 1994

[51] Int. Cl.⁶ ........................................ B66F 9/12
[52] U.S. Cl. ................. 414/607; 414/626; 294/67.31; 294/97
[58] Field of Search .................... 414/607, 619, 414/620, 626; 294/67.31, 81.51, 97

[56] References Cited

U.S. PATENT DOCUMENTS

| | | | |
|---|---|---|---|
| 2,687,226 | 8/1954 | Garrett | 414/607 |
| 2,784,861 | 3/1957 | Nelson. | |
| 2,841,300 | 7/1958 | Berquist. | |
| 2,841,301 | 7/1958 | Sherriff | 414/607 |
| 2,941,683 | 6/1960 | Fowler. | |
| 3,180,514 | 4/1965 | Horton. | |
| 3,195,751 | 7/1965 | Meyers et al. | 414/607 |
| 3,245,562 | 4/1966 | Horton. | |
| 3,257,142 | 6/1966 | Barry | 294/81.51 X |
| 3,396,862 | 8/1968 | Fischer | 414/607 |
| 3,410,431 | 11/1968 | Vik. | |
| 3,984,019 | 10/1976 | Brudi et al. | 414/607 |
| 4,795,203 | 1/1989 | Karlsson | 414/607 X |
| 4,952,118 | 8/1990 | Macmillan | 414/626 X |
| 4,983,094 | 1/1991 | Ping | 414/621 |
| 5,370,435 | 12/1994 | Monk et al. | 414/607 X |

FOREIGN PATENT DOCUMENTS

| | | | |
|---|---|---|---|
| 0284680 | 10/1988 | European Pat. Off. | 294/97 |
| 3733622 | 4/1989 | Germany | 414/626 |
| 0117822 | 5/1988 | Japan | 414/619 |
| 1502454 | 8/1989 | U.S.S.R. | 294/81.51 |
| 1523522 | 11/1989 | U.S.S.R. | 294/67.31 |

*Primary Examiner*—Michael S. Huppert
*Assistant Examiner*—James W. Keenan
*Attorney, Agent, or Firm*—Willian Brinks Hofer Gilson & Lione

[57] ABSTRACT

A process of handling a frame of a vehicle and an apparatus for a lift truck for handling a frame of a vehicle. The apparatus includes a support frame operatively connected to and cantilevered from the lift truck and a carriage suspended from the support frame. The carriage includes at least two oppositely acting depending arms for handling the vehicle frame.

12 Claims, 3 Drawing Sheets

PROCESS AND APPARATUS FOR HANDLING A VEHICLE FRAME

FIELD OF THE INVENTION

This invention relates to a process and an apparatus for handling a vehicle frame. More particularly, this invention relates to an apparatus adaptable to the front end of a forklift and other material handling equipment for handling a vehicle frame such as an automobile frame for use in assembly line manufacturing and the process of using the apparatus.

BACKGROUND OF THE INVENTION

This invention is concerned with an apparatus and process for handling a vehicle frame. It is known that in many modern vehicle manufacturing facilities in order to reduce cost and conserve manufacturing floor space the frame of the vehicle is manufactured off sight and transported to the manufacturing facility as needed in the assembly process. The various vehicle frames are typically transported in stacks of between 12–15 frames which rise over 21 feet high. Each vehicle frame is approximately 8–12 inches high and are spaced about 5–8 inches apart in the stack. As a particular vehicle frame is required during the assembly of a vehicle a portion of the stack of vehicle frames containing the particular vehicle frame of interest is separated from the other frames in the stack by a forklift and then placed on the floor. The particular frame of interest is then manually removed from the separated stack portion and inserted in the assembly line. It will be appreciated that the selection of a particular vehicle frame from among a stack of vehicle frames is a cumbersome and time consuming process. This process is made even more complicated as more and more stacks are separated to obtain the various vehicle frames of interest.

In addition to the foregoing problems of locating and separating a vehicle frame from a stack of vehicle frames, it will be further appreciated that when dividing the stack of vehicle frames the front end of the forklift directly contacts the underside of the bottom vehicle frame to lift the frame of interest and all of the frames on top of that frame thereby increasing the possibility that the bottom frame may be damaged as the frame is moved.

In view of the foregoing, there is a significant need for an improved apparatus and process for handling a vehicle frame. An object of the present invention is to provide an apparatus adaptable to the front end of a forklift and other material handling equipment for handling a vehicle frame such as an automobile frame for use in assembly line manufacturing and the process of using the apparatus. Another object of the present invention is to provide an apparatus for handling a vehicle frame that is readily adaptable to a fork lift truck. Yet another object of the present invention is to provide an apparatus for handling a vehicular frame that is simple and economical to manufacture.

SUMMARY OF THE INVENTION

Briefly, according to this invention there is provided an apparatus for a lift truck for handling a frame of a vehicle. The apparatus includes a support frame operatively connected to and cantilevered from the lift truck and a carriage suspended from the support frame. The carriage includes at least two oppositely acting depending arms for handling the vehicle frame. The frame of a vehicle is handled by positioning the frame handling apparatus above the frame of the vehicle and lowering at least the depending arms between the parallel members of the vehicle frame. The depending arms are then moved outward in opposing directions such that the arms engage the parallel members and then at least the depending arms are raised thereby lifting the vehicle frame.

BRIEF DESCRIPTION OF THE DRAWINGS

Further features and other objects and advantages of the invention will become clear from the following detailed description made with reference to the drawings in which.

DESCRIPTION OF THE PREFERRED EMBODIMENTS

Figure 1:
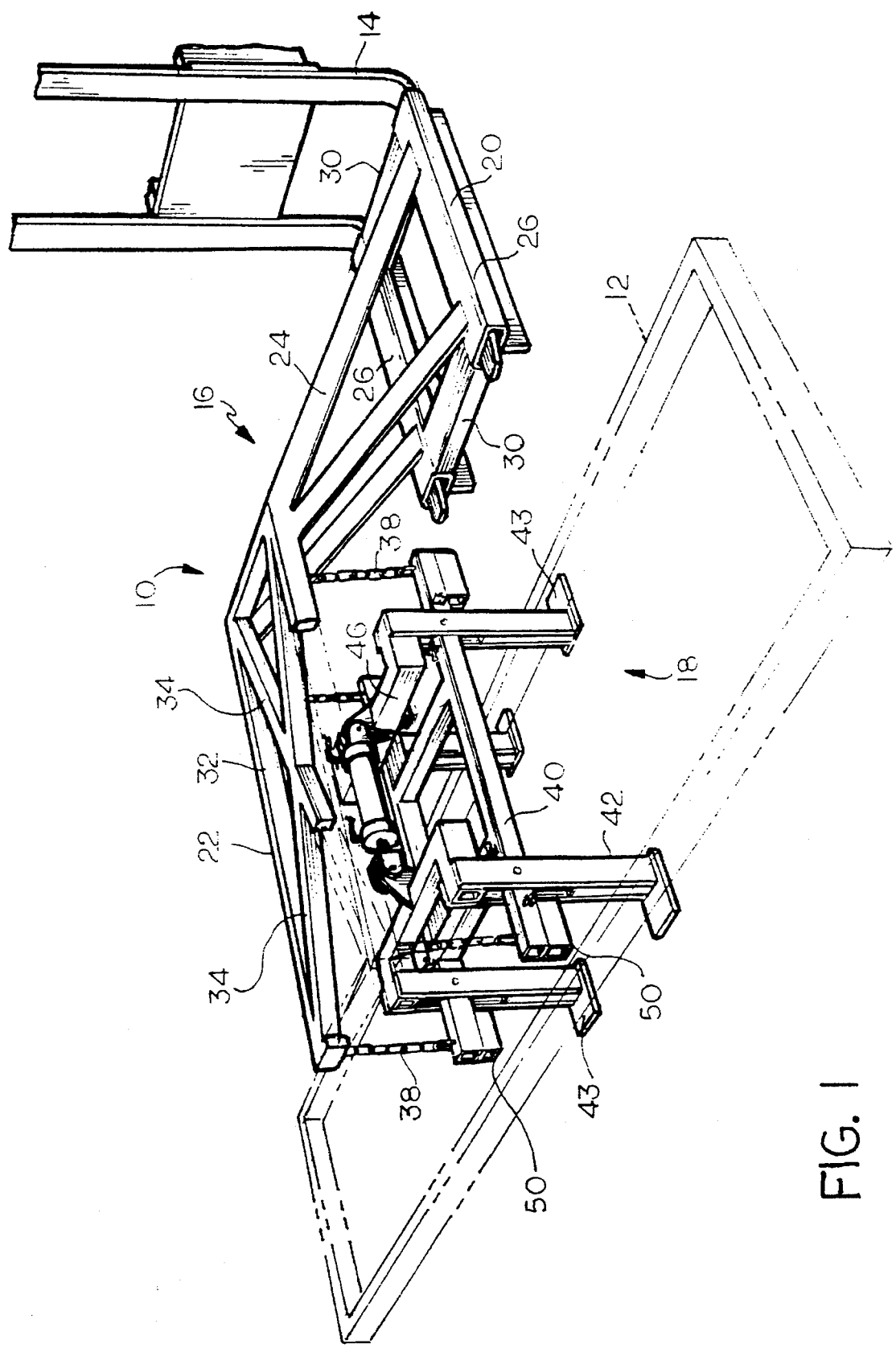
FIG. 1 is a partial perspective view of an apparatus for a lift truck for handling a frame in accordance with the present invention.

In the following description like reference characters represent like or corresponding elements. Also in the following description it is to be understood that such terms as "forward", "rearward", "left", "right" and the like are words of convenience and are not necessarily limiting terms.

The apparatus 10 for handling a vehicle frame is designed to be used in cooperation with material handling equipment such as a forklift truck of a conventional design, however, it will be appreciated that the apparatus may also be used with other lift trucks to handle a variety of objects having spaced members which may be grasped from above. Referring to FIG. 1, only the forks 14 of the fork lift truck and a rectangular frame 12 intended to be representative of a vehicle frame are shown for clarity and conciseness. It is sufficient to an understanding of the present invention to note that the forks 14 of the lift truck are mounted for vertical movement on a conventional mast structure which includes a pair of movable uprights.

During the operation of a typical lift truck without the apparatus of the invention, the horizontal portions of the forks 14 may be inserted beneath a load that is to be moved or carried. The mast will then be pivoted rearwardly about a horizontal axis at the lower end thereof in a conventional manner. The forks 14 are then elevated sufficiently to raise the load from the ground as it is being transported from one location to another. For a detailed description of a fork lift truck and the operation of a fork lift truck reference is made to U.S. Pat. No. 3,410,431, incorporated herein by reference.

As shown in the figures, the apparatus 10 includes a support frame 16 and a carriage 18 suspended from the support frame. The support frame 16 and carriage 18 may be formed of most any suitable material such as steel and the like. Although the apparatus 10 is shown as an attachment that may be separated from the lift truck it will be appreciated that the apparatus may also be permanently fixed to the lift truck and function as well. However, for improved versatility in the operation of the lift truck it is preferred that the apparatus 10 is capable of being separated from the lift truck to preserve a further useful function of the lift truck as previously described.

Figure 2:
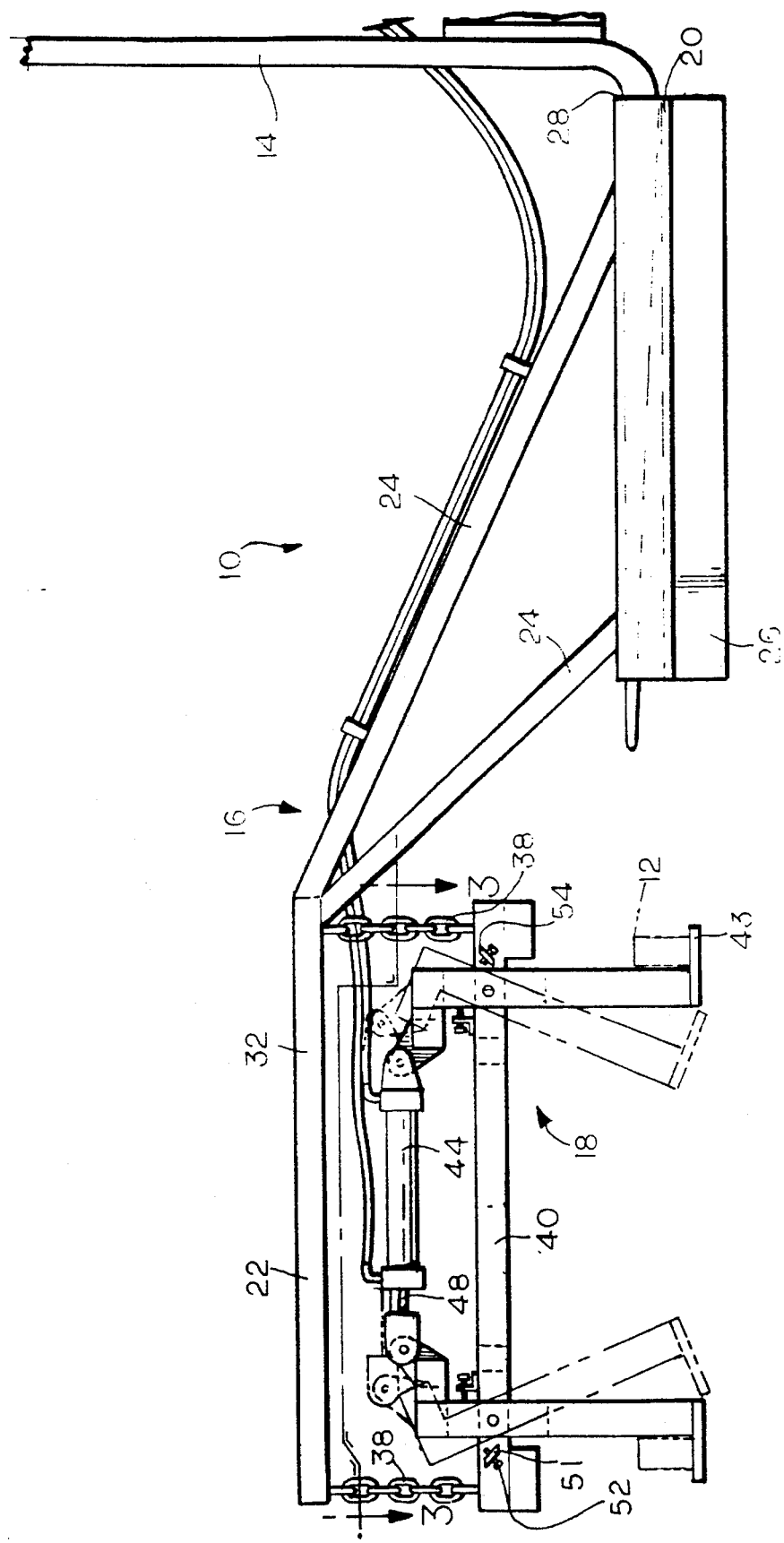
FIG. 2 is a side view of the apparatus of FIG. 1.
Figure 3:
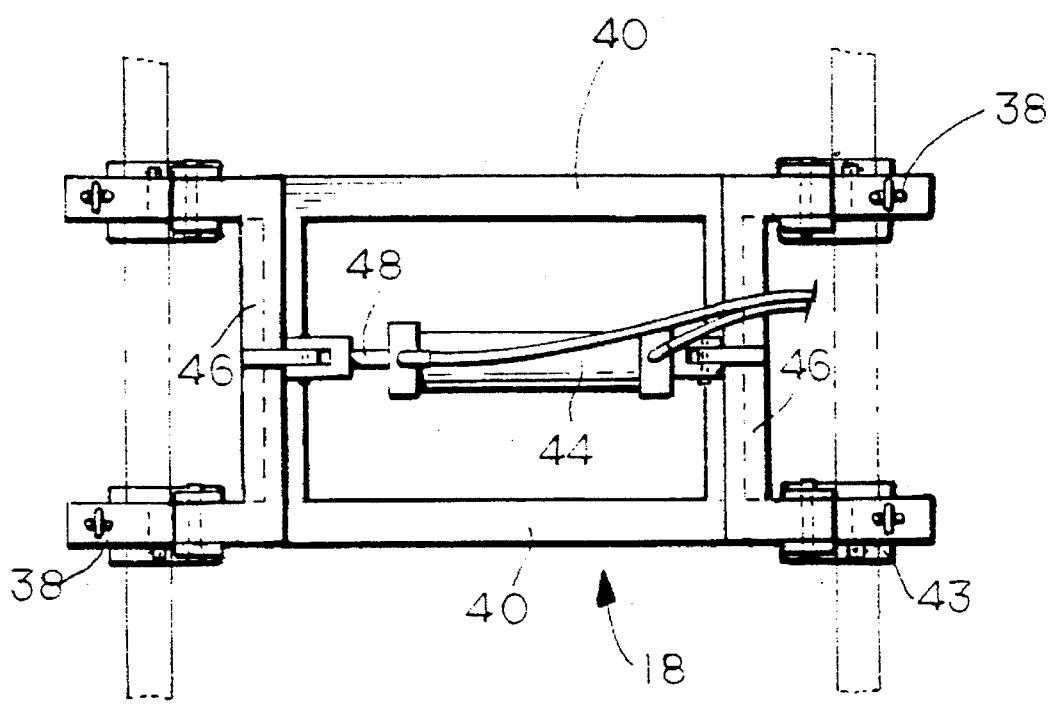
FIG. 3 is a view taken along line 3—3 of FIG. 2.

As shown in FIGS. 1 and 2, the apparatus 10 is attached to the lift truck by inserting the forks 14 of the lift truck within the support frame 16 of the apparatus. The support frame 16 generally includes a lower frame 20, an upper frame 22 and brace members 24 connected to the lower frame for supporting the upper frame in a raised position cantilevered from the lift truck.

The lower frame 20 of the support frame 16 has two generally parallel elongated members 26. The elongated members 26 each include an opening 28 sized and positioned to receive a fork 14 of the lift truck. The elongated members 26 are fixed in a spaced parallel relationship by cross members 30 which extend therebetween. In a preferred embodiment, the openings 28 of the elongated members 26 extend the length of the elongated members. The elongated members 26 may be formed from most any suitable structurally rigid material such as square steel tubing and the like to withstand the stress and strain experienced during handling of vehicle frames.

The upper frame 22 of the support frame 16 includes two spaced parallel support members 32 and a cross piece member 34 connecting the respective ends of the support members to maintain the support members in a parallel and racked position. Extending between the upper frame and lower frame are the brace members 24. The brace members 24 position the upper frame 22 in a fixed elevated position a selected distance from the lower frame 20 such that the upper frame is cantilevered from the lower frame and the lift truck. It will be appreciated that by cantilevering the upper frame 22 from the lift truck the field of vision of the operator of the lift truck is maintained and the forks 14 of the lift truck are prevented from hindering or interfering with the operation of the invention. Suspended from the upper frame 22 is a carriage 18. The carriage 18 is suspended from the upper frame 22 to allow the carriage to shift and sway to prevent damage to the frame 12 to be handled which may be caused by contact with the carriage or to prevent damage to the carriage when the carriage contacts an object. The carriage 18 may be suspended from the upper frame 22 by most any suitable means having sufficient strength to allow the carriage to hang below the support frame 16. In a preferred embodiment, the carriage 18 is suspended from the upper frame 22 by equivalent length chain segments 38 generally secured at the corners of the upper frame 22 and hanging downward to opposing ends of the carriage.

The carriage 18 includes two or more cross members 40 and at least two oppositely acting legs 42. The legs 42 include feet members 43 which extend laterally therefrom and engage the underside of the frame 12. The legs 42 extend downward from and are pivotally secured to the cross members 40. Opposing pairs of legs 42 are actuated by a hydraulic device 44 which connects the legs. In a preferred embodiment, two pair of oppositely acting legs 42 pivot about two parallel spaced cross members 40 which are suspended from the support frame 16. Pairs of legs 42 are connected by a cross brace 46 which is actuated by a hydraulic device 44 which extends between and connects opposing pairs of the legs. The hydraulic device 44 is of a conventional design having a cylinder and rod 48 which is movable as a function of the internal pressure created by the flow of a liquid such as oil or water within the cylinder. The hydraulic device 44 is operatively connected to a conventional control device including hydraulic actuating controls through quick disconnect hoses to cause a variation in the internal pressure within the cylinder as previously described.

Secured to an end of each cross member is a guide pad 50. The guide pads 50 are sized and spaced in such a manner that as the carriage 18 is lowered between the frame 12 members the retracted legs 42 act to center the carriage between the frame members to a position whereby the carriage comes to rest on top of the frame on the guide pads 50 as indicated by a slackening in the chain segments 38. When the guide pads 50 are resting on the frame 12 the legs 42 and feet members 43 are automatically positioned at a desired depth in relation to the underside of the frame. While the carriage 18 is resting on the frame 12, and since the carriage is suspended and not rigidly mounted to the upper frame 22, as the legs 42 rotate outward to a lifting position the legs slide the carriage on the guide pads 50 to bring the carriage to a centered position over the frame 12 members, thereby making the apparatus virtually self aligning.

The hydraulic device 44 and distance between the cross braces 46 is sized such that the rod 48 of the hydraulic device contacts the bottom of the cylinder when the legs 42 are fully extended in opposing relation to support the underside of the frame 12. Moreover, when the rod 48 is fully extended as shown in FIG. 2, the legs 42 are fully retracted to allow the legs to pass between and below parallel members forming the frame 12.

For improved operation and control, the range of pivotal movement of the legs 42 may be limited by a stop mechanism 51. The stop mechanism 51 includes a bolt 52 or the like threaded through a plate 54 attached to the cross piece member 34. By adjusting the depth of the bolt 52 within the plate 54 the range of movement of the legs 42 may be varied as desired. In a preferred embodiment, the legs 42 should clear the distance between the parallel members of the frame 12 when retracted and when extended contact the parallel members so as not to damage the parallel members. In addition, when the stop mechanism 51 is properly adjusted and the legs 42 are in the fully extended position between the parallel members of the frame 12 the carriage 18 self aligns above the frame thereby simplifying removal of the frame from the stack of frames.

The patents referred to herein are hereby incorporated by reference.

Having described presently preferred embodiments of the invention, it is to be understood that the invention may be otherwise embodied within the scope of the appended claims.

What is claimed is:

1. An apparatus for a lift truck for handling a frame of a vehicle, the apparatus comprising:

a support frame operatively connected to and cantilevered from the lift truck, said support frame including a lower frame, an upper frame and brace members, said brace members connected to said lower frame for supporting said upper frame in a raised position and cantilevered from the lift truck;

a carriage suspended from said upper frame by chain segments secured to said upper frame and to said carriage to allow said carriage to shift and sway, said carriage including at least two pairs of oppositely acting depending legs having feet members which extend laterally from said legs to engage an underside of the frame for handling the vehicle frame, said legs pivot about two parallel spaced cross members which are suspended from said support frame, said pairs of legs being connected by a cross brace which is actuated by a hydraulic device which extends between and connects said opposing pairs of legs.

2. The apparatus of claim 1 wherein said lower frame of said support frame includes two generally parallel elongated members, said elongated members each having an opening sized and positioned to receive a fork of the lift truck.

3. The apparatus of claim 2 wherein said upper frame includes two spaced parallel support members and a cross piece member perpendicular to said support members connecting said support members to maintain said support members in a parallel position.

4. The apparatus of claim 1 wherein said brace members extend between said upper frame and said lower frame, said brace members position said upper frame in a fixed elevated position a selected distance from said lower frame such that said upper frame is cantilevered from said lower frame and the lift truck.

5. The apparatus of claim 1 wherein said legs extend downward from and are pivotally secured to cross members and are actuated by a hydraulic device which connects said legs.

6. The apparatus of claim 5 further comprising a stop mechanism to limit the range of pivotal movement of said legs.

7. The apparatus of claim 6 wherein said stop mechanism includes a bolt threaded through a plate attached to said cross piece member such that by adjusting said bolt depth within said plate the range of movement of said legs may be varied.

8. A lift truck having an apparatus for handling a frame of a vehicle, the lift truck comprising:

forks mounted for vertical movement on a mast structure attached to said lift truck, a support frame operatively connected to and cantilevered from said forks, said support frame including a lower frame, an upper frame and brace members, said brace members connected to said lower frame for supporting said upper frame in a raised position and cantilevered from said lift truck; and a carriage suspended from said upper frame by chain segments secured to said upper frame and to said carriage to allow said carriage to shift and sway, said carriage including at least two pairs of oppositely acting depending legs that pivot about two parallel spaced cross members which are suspended from said support frame, said pairs of legs being connected by a cross brace which is actuated by a hydraulic device which extends between and connects said opposing pairs of legs for handling the vehicle frame.

9. The apparatus of claim 8 wherein said lower frame of said support frame includes two generally parallel elongated members, said elongated members each having an opening sized and positioned to receive a fork of said lift truck.

10. The apparatus of claim 9 wherein said upper frame includes two spaced parallel support members and a cross piece member perpendicular to said support members connecting said support members to maintain said support members in a parallel position.

11. The apparatus of claim 8 wherein said carriage includes at least two cross members and at least two oppositely acting legs, said legs having feet members which extend laterally therefrom and engage the underside of the frame.

12. The apparatus of claim 8 further comprising a stop mechanism to limit the range of pivotal movement of said legs.

* * * * *